United States Patent
Krog

(10) Patent No.: US 6,776,270 B2
(45) Date of Patent: Aug. 17, 2004

(54) PISTON-CYLINDER UNIT AND METHOD FOR THE MANUFACTURE THEREOF

(75) Inventor: Andreas Krog, Winkelhaid (DE)

(73) Assignee: SUSPA Holding GmbH, Altdorf (DE)

( * ) Notice: Subject to any disclaimer, the term of this patent is extended or adjusted under 35 U.S.C. 154(b) by 0 days.

(21) Appl. No.: 10/350,262

(22) Filed: Jan. 24, 2003

(65) Prior Publication Data

US 2003/0136620 A1 Jul. 24, 2003

(30) Foreign Application Priority Data

Jan. 24, 2002 (DE) ........................................ 102 02 529

(51) Int. Cl.[7] .................................................. F16F 9/32
(52) U.S. Cl. ...................................... 188/300; 267/120
(58) Field of Search ........................... 188/300, 322.19; 267/64.12, 120; 248/161; 297/344.19

(56) References Cited

U.S. PATENT DOCUMENTS

| | | | | |
|---|---|---|---|---|
| 3,722,640 A | * | 3/1973 | Taylor | 188/316 |
| 4,281,884 A | * | 8/1981 | Freitag et al. | 267/120 |
| 4,449,702 A | * | 5/1984 | Hasegawa | 267/64.12 |
| 5,358,225 A | * | 10/1994 | Volpel et al. | 267/64.12 |
| 6,053,487 A | * | 4/2000 | Yotani et al. | 267/140.11 |
| 6,439,662 B2 | * | 8/2002 | Ma | 188/322.19 |

FOREIGN PATENT DOCUMENTS

| | | |
|---|---|---|
| DE | 82 08 431.9 U1 | 3/1982 |
| DE | 195 47 326 C2 | 12/1995 |
| DE | 197 21 816 A1 | 5/1997 |
| DE | 197 56 557 A1 | 12/1997 |

* cited by examiner

Primary Examiner—Chris Schwartz
(74) Attorney, Agent, or Firm—Browdy and Neimark, P.L.L.C.

(57) ABSTRACT

A piston-cylinder unit, in particular a gas spring, comprises a substantially cylindrical casing with a central longitudinal axis, the casing having a first end with an edge that is bent inwards, a closed second end, and an interior space that is filled with a working fluid; a guide unit which is disposed in the casing in the vicinity of the first end and supported outwards by the inwardly bent edge; a piston rod which is coaxial to the central longitudinal axis and which is displaceably passed through the guide unit and which has a piston on the end of the piston rod that is on the side of the interior space; the piston-cylinder unit is characterized in that a plastic sleeve is mounted on the edge, enfolding the edge on the outside of the casing.

13 Claims, 1 Drawing Sheet

PISTON-CYLINDER UNIT AND METHOD FOR THE MANUFACTURE THEREOF

BACKGROUND OF THE INVENTION

1. Field of the Invention

The invention relates to a piston-cylinder unit, in particular a gas spring, and a method for the manufacture of an anticorrosive piston-cylinder unit.

2. Background Art

Gas springs have been known in large numbers for quite a while; they are used in practice for instance as tailgate gas springs in motorcars. The metal casings of gas springs are painted after assembly of the gas spring. The beaded edge of the casing cannot be painted completely in particular in the case of electrostatic enameling so that corrosion problems arise with prolonged use.

SUMMARY OF THE INVENTION

It is an object of the invention to embody a piston-cylinder unit that is not susceptible to corrosion.

According to the invention, a piston-cylinder unit, in particular a gas spring, comprises a substantially cylindrical casing with a central longitudinal axis, which has a first end with an edge that is bent inwards, a closed second end, and an inner space that is filled with a working fluid; a guide unit, which is disposed in the casing in the vicinity of the first end and which is supported outwards by the inwardly bent edge; a piston rod, which is coaxial to the central longitudinal axis, which is displaceably passed through the guide unit, and which has a piston on the end of the piston rod that is on the side of the interior space. In such a piston-cylinder unit, the object of the invention is attained by the features which consist in that a plastic sleeve is mounted on the edge of the casing, which has at least a first cuff that enfolds the edge on the outside of the casing; and by a method for the manufacture of an anticorrosive piston-cylinder unit, including the following steps: providing a piston-cylinder unit, which comprises a substantially cylindrical casing with a central longitudinal axis, the casing having a first end with an inwardly bent edge, a closed second end and an inner space that is filled with a working fluid, a guide unit, which is disposed within the casing in the vicinity of the first end and supported outwards by the inwardly bent edge, a piston rod, which is coaxial to the central longitudinal axis and which is displaceably passed through the guide unit and the end of which on the side of the interior space has a piston, and a plastic sleeve, which is mounted on the edge and has an annular first cuff that projects outwards in the axial direction; coating the outside of the casing with an anticorrosive layer; and bending the first cuff so that it enfolds the edge. The gist of the invention resides in that a plastic sleeve with a cuff is fixed to the inwardly bent edge of the casing, enclasping the outer edge of the casing.

Additional features and details of the invention will become apparent from the description of an exemplary embodiment, taken in conjunction with the drawings.

DESCRIPTION OF THE PREFERRED EMBODIMENT

Figures 1, 2:
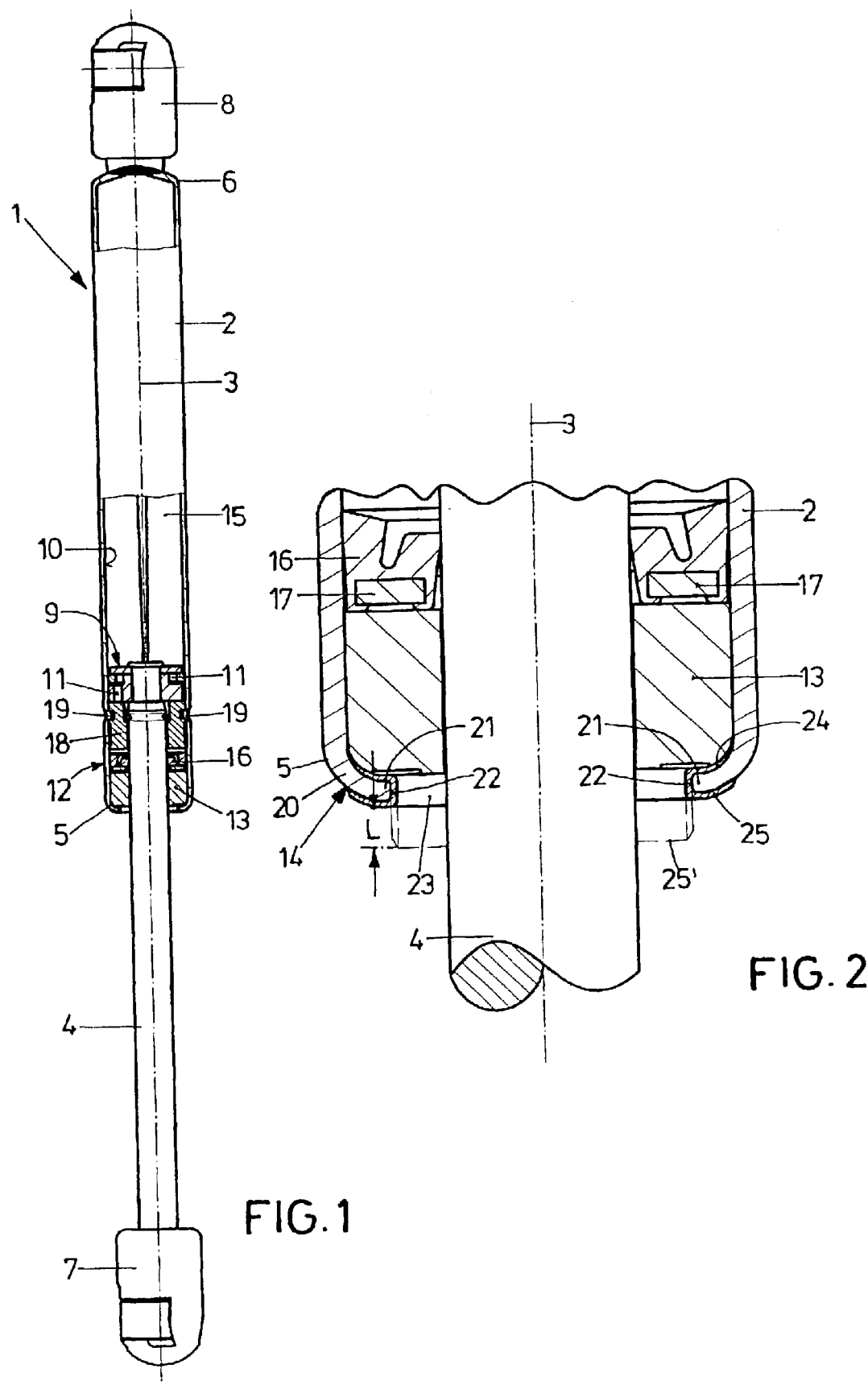
FIG. 1 is a longitudinal view of a gas spring in an illustration partially broken away.
FIG. 2 is an enlarged detail of a longitudinal section of the gas spring according to FIG. 1.

A gas spring 1 in the form of a piston-cylinder unit comprises a casing 2, which substantially consists of a cylindrical tube, and is filled with pressurized gas and has a central longitudinal axis 3 and a piston rod 4, which is coaxial to the axis 3 and displaceable within the casing 2. The piston rod 4 is extended out of the casing 2 at a first end 5 thereof. A second end 6 of the casing 2 is closed gas-tightly. Attached to the free outer end of the piston rod 4 and to the second end 6 of the casing 2 are fastening elements 7, 8, for instance in the form of so-called ball cups.

The end of the piston rod 4 that is inside the casing 2 is equipped with a piston 9 which is guided on the inside wall 10 of the casing 2. The piston 9 is a so-called damping piston, to which end it has damping passages 11, which the gas passes through when the piston rod 4 is pushed into the casing 2 and extended out of the casing 2. Varying damping characteristics can be set for the insertion and extraction. Pistons 9 of the generic type are general practice and widely spread.

At the first end 5 of the casing 2, the piston rod 4 is led through a guide, seal and lubricator unit 12 which finishes the casing 2, it being possible that the unit 12 works without lubrication. The unit 12 comprises a guide ring 13, which is directly turned towards the first end 5 and supported on the inside wall 10 of the casing, and in which the piston rod 4 is guided radially nearly free from play concentrically of the axis 3, however displaceably in the direction of the axis 3. The guide ring 13 is safeguarded against slipping out the casing 2 by a beaded edge 14 of the casing 2. A double action seal 16 is disposed between the guide ring 13 and the interior space 15 of the casing 2, sealingly bearing against the inside wall 10 of the casing 2 on the one hand and against the piston rod 4 on the other. The seal 16 is reinforced by a reinforcement ring 17, for example of metal. The seal 16 and the guide ring 13 are pressed against the edge 14 by the gas pressure inside the casing 2. Towards the interior space 15 of the casing 2, the unit 12 finishes by an intermediary sleeve 18 which is arrested relative to the casing 2 in the direction of the axis 3 by depressions 19 which may be a crimp or impressed spots along the circumference of the casing. The piston 9 bears against this intermediary sleeve 18 when the piston rod 4 is completely extended.

The beaded edge 14 has a curved section 20 that adjoins the cylindrical casing 2 as well as a section 22 that projects radially inwards and has an inner surface 22 turned towards the piston rod 4. A plastic sleeve 23 is mounted on the edge 14, comprising an inner cuff 24 on the casing inside and an outer cuff 25 on the casing outside. Both cuffs 24 and 25 as well as the plastic sleeve 23 enfold the edge 14. The inner cuff 24 rests liquid tight on the inside of the edge 14 and reaches as far as to where the curved section 20 passes into the cylindrical part of the casing 2. A different reach of the cuff 24 is also conceivable. The outer cuff 25 is liquid tight on the outs side of the edge 14, reaching as far as to the middle of the curved section 20. Typically, the outer cuff 25 has a length L, to which 2 mm$\leq$L$\leq$10 mm applies. The outside of the casing 2 is coated with an anticorrosive layer, which may for example be a coating powder or a three-component water lacquer. The anticorrosive layer extends at least partially underneath the outer cuff 25. The length of the cuff 25 is selected such that it reaches at least as far as to the area of the edge 14 that is impeccably painted, partially overlapping it where possible. By advantage, the plastic material of the sleeve 23 is selected such that it bonds to the anticorrosive layer.

The following is a detailed description of the manufacture of the gas spring 1 that is protected against corrosion in the vicinity of the first end 5. A gas spring 1 seen in FIG. 1 is conventionally assembled. As illustrated by dashed lines in FIG. 2, the plastic sleeve 23 has an annular cylindrical cuff 25' that extends axially outwards. Thus the entire outside of the edge 14 is not covered by the plastic sleeve 23. Then the casing 2 is electrostatically charged and painted. As the edge 14 is beaded, paint does not reach the extreme boundary of the edge 14, which gives rise to problems of corrosion in conventional gas springs. Once the painting job is terminated, the cuff 25' is bent over into the position of the cuff 25 so that the area of the edge 14, which may possibly not be completely coated with paint, is covered and made liquid tight by the plastic cuff 25. Bending the cuff 25' takes place by the action of heat, which is why thermoplastic is the material chosen for the plastic sleeve 23 and the cuff 25. The plastic material is selected such that it bonds to the applied paint. It is also possible to bend the cuff 25 mechanically. The edge 14 is protected against corrosion due to the fact that the edge 14 that is not or only partially painted is covered by the cuff 25.

A sleeve 23 which is integral with the guide ring 13 may be provided instead of the inner cuff 24. In this case, it is not necessary to arrest the sleeve by the inner cuff 24 and the outer cuff 25. It is further conceivable to provide an outer cuff 25 of conductive plastic material. In the case of electrostatic enameling, this has the advantage of reducing the boundary effects that lead to incomplete painting of the edge 14, because in this case also the outer cuff 25 attracts paint.

What is claimed is:

1. A piston-cylinder unit, comprising
   a substantially cylindrical casing (2) with a central longitudinal axis (3), which has
      a first end (5) with an inwardly bent edge (14) that is bent inwards comprising a curved section (20) that adjoins the casing (2),
      a closed second end (6), and
      an inner space (15) that is filled with a working fluid;
   a guide unit (13), which is disposed in the casing (2) in the vicinity of the first end (5) and which is supported outwards by the inwardly bent edge (14);
   a piston rod (4),
      which is coaxial to the central longitudinal axis (3),
      which is displaceably passed through the guide unit (13), and
      which has a piston (9) on the end of the piston rod (4) that is on the side of the interior space;
   wherein a plastic sleeve (23) is mounted on the edge (14) of the casing (2),
      which has at least a first cuff (25) that enfolds the edge (14) on the outside of the casing (2);
   wherein the first cuff (25) covers the outside of the inwardly bent edge (14);
   wherein the part of the outside of the casing (2) that is covered by the first cuff (25) is coated at least partially with an anticorrosive layer;
   wherein the first cuff (25) enfolds the edge (14) in a liquid tight manner;
   wherein the plastic sleeve (23) comprises a second cuff (24) which enfolds the edge (14) on the inside of the casing (2);
   wherein the outer cuff (25) reaches as far as to the middle of the curved section (20).

2. A piston-cylinder unit according to claim 1, wherein the outside of the casing (2) is electrostatically coated with an anticorrosive layer.

3. A piston-cylinder unit according to claim 2, wherein the plastic sleeve (23) consists at least partially of electrically conductive plastic material.

4. A piston-cylinder unit according, to claim 1, wherein the plastic sleeve (23) is integral with the guide unit (13).

5. A method for the manufacture of an anticorrosive piston-cylinder unit, comprising the following steps:
   provide a piston-cylinder unit, which comprises
      a substantially cylindrical casing (2) with a central longitudinal axis (3), the casing (2) having a first end (5) with an inwardly bent edge (14), a closed second end (6) and an inner space (15) that is filled with a working fluid,
      a guide unit (13), which is disposed within the casing (2) in the vicinity of the first end (5) and supported outwards by the inwardly bent edge (14),
      a piston rod (4), which is coaxial to the central longitudinal axis (3) and which is displaceably passed through the guide unit (13) and the end of which on the side of the interior space has a piston (9), and
      a plastic sleeve (23), which is mounted on the edge (14) and has an annular first cuff (25) that projects outwards in the axial direction;
   coating the outside of the casing (2) with an anticorrosive layer; and
   bending the first cuff (25) so that it enfolds the edge (14) and covers in a liquid tight manner at least partially the anticorrosive layer.

6. A method according to claim 5, wherein bending the cuff (25) takes place mechanically.

7. A method according to claim 5, wherein bending the cuff (25) takes place by the action of heat.

8. A piston-cylinder unit comprising
   a substantially cylindrical casing (2) with a central longitudinal axis (3), which has
      a first end (5) with an edge (14) that is bent inwards,
      a closed second end (6), and
      an inner space (15) that is filled with a working fluid;
   a guide unit (13), which is disposed in the casing (2) in the vicinity of the first end (5) and which is supported outward by the inwardly bent edge (14);
   a piston rod (4),
      which is coaxial to the central longitudinal axis (3),
      which is displaceably passed through the guide unit (13), and
      which has a piston (9) on the end of the piston rod (4) that is on the side of the interior space;
   wherein a plastic sleeve (23) is mounted on the edge (14) of the casing (2),
      which has at least a first cuff (25) that enfolds the edge (14) on the outside of the casing (2);
   wherein the outside of the casing (2) is electrostatically coated with an anticorrosive layer;
   wherein the plastic sleeve (23) consists at least partially of electrically conductive plastic material.

9. A piston-cylinder unit according to claim 8, wherein the first cuff (25) covers the outside of the inwardly bent edge 14).

10. A piston-cylinder unit according to claim 8, wherein the part of the outside of the casing (2) that is covered by the first cuff (25) is coated at least partially with an anticorrosive layer.

11. A piston-cylinder unit according to claim 8, wherein the first cuff (25) enfolds the edge (14) in a liquid tight manner.

12. A piston-cylinder unit according to claim 8, wherein the plastic sleeve (23) comprises a second cuff (24) which enfolds the edge (14) on the inside of the casing (2).

13. A piston-cylinder unit according to claim 8, wherein the plastic sleeve (23) is integral with the guide unit (13).

* * * * *